(12) United States Patent
Ohtsuki

(10) Patent No.: US 7,820,065 B2
(45) Date of Patent: Oct. 26, 2010

(54) ADDITIVE FOR NON-AQUEOUS ELECTROLYTE OF ELECTRIC DOUBLE LAYER CAPACITOR, NON-AQUEOUS ELECTROLYTE FOR ELECTRIC DOUBLE LAYER CAPACITOR AND NON-AQUEOUS ELECTROLYTE ELECTRIC DOUBLE LAYER CAPACITOR

(75) Inventor: Masashi Ohtsuki, Koganei (JP)

(73) Assignee: Bridgestone Corporation, Tokyo (JP)

( * ) Notice: Subject to any disclaimer, the term of this patent is extended or adjusted under 35 U.S.C. 154(b) by 1001 days.

(21) Appl. No.: 11/568,035

(22) PCT Filed: Mar. 29, 2005

(86) PCT No.: PCT/JP2005/005915

§ 371 (c)(1),
(2), (4) Date: Oct. 18, 2006

(87) PCT Pub. No.: WO2005/106906

PCT Pub. Date: Nov. 10, 2005

(65) Prior Publication Data

US 2009/0213528 A1    Aug. 27, 2009

(30) Foreign Application Priority Data

Apr. 27, 2004 (JP) ............................. 2004-131151
Dec. 7, 2004 (JP) ............................. 2004-353975

(51) Int. Cl.
*H01G 9/038* (2006.01)

(52) U.S. Cl. ...................... 252/62.2; 361/502; 361/503; 558/72; 558/83; 558/84

(58) Field of Classification Search ................... 558/72, 558/83, 84; 252/62.2; 361/502, 503
See application file for complete search history.

(56) References Cited

U.S. PATENT DOCUMENTS

2004/0126658 A1 * 7/2004 Otsuki et al. ................ 429/199

FOREIGN PATENT DOCUMENTS

| EP | 1204157 | | 5/2002 |
|---|---|---|---|
| JP | 61-208758 | A | 9/1986 |
| JP | 4-206918 | A | 7/1992 |
| JP | 11-283669 | * | 10/1999 |
| JP | 2001-338679 | * | 12/2001 |
| WO | 02/082575 | A1 | 10/2002 |
| WO | WO 02/082575 | * | 10/2002 |

* cited by examiner

*Primary Examiner*—C. Melissa Koslow
(74) *Attorney, Agent, or Firm*—Sughrue Mion, PLLC

(57) ABSTRACT

This invention relates to an additive for a non-aqueous electrolyte of an electric double layer capacitor comprising a combustion inhibiting substance releasing compound capable of releasing a combustion inhibiting substance having particularly excellent combustion inhibiting effect during combustion, and more particularly to an additive for a non-aqueous electrolyte of an electric double layer capacitor comprising a combustion inhibiting substance releasing compound which releases a combustion inhibiting substance during combustion, characterized in that the combustion inhibiting substance is a phosphine oxide compound having P—F bond and/or P—$NH_2$ bond in its molecule.

15 Claims, No Drawings

ADDITIVE FOR NON-AQUEOUS ELECTROLYTE OF ELECTRIC DOUBLE LAYER CAPACITOR, NON-AQUEOUS ELECTROLYTE FOR ELECTRIC DOUBLE LAYER CAPACITOR AND NON-AQUEOUS ELECTROLYTE ELECTRIC DOUBLE LAYER CAPACITOR

TECHNICAL FIELD

This invention relates to an additive for a non-aqueous electrolyte of an electric double layer capacitor, a non-aqueous electrolyte for an electric double layer capacitor containing such an additive and a non-aqueous electrolyte electric double layer capacitor comprising such a non-aqueous electrolyte, and more particularly to an additive for a non-aqueous electrolyte of an electric double layer capacitor having particularly excellent combustion inhibiting effect.

BACKGROUND ART

The electric double layer capacitor is a condenser utilizing an electric double layer formed between an electrode and an electrolyte, in which a cycle of electrically adsorbing an ion on a surface of the electrode from the electrolyte is a charge-discharge cycle, so that it is different from a battery in which a cycle of oxidation-reduction reaction accompanied with a mass transfer is a charge-discharge cycle. Therefore, the electric double layer capacitor is excellent in the instant charge-discharge characteristics as compared with the battery, and also it is not accompanied with the chemical reaction and hence the instant charge-discharge characteristics are not substantially deteriorated even in the repetition of the charge-discharge. Also, a simple and cheap electric circuit is sufficient in the electric double layer capacitor because there is no overvoltage in the charge-discharge. Further, it has many merits that the residual capacity is easily understandable and the temperature durability is good over a wide temperature range of −30 to 90° C. and there is no pollution and the like as compared with the battery, so that it recently comes under the spotlight as an earth-conscious and new energy-storing product. Furthermore, since the electric double layer capacitor has the above-mentioned characteristics, it also comes under the spotlight as a power source for energy regeneration or engine start-up in an electric automobile, a fuel cell vehicle and a hybrid electric automobile.

The electric double layer capacitor is an energy-storing device comprising positive and negative electrodes and an electrolyte, in which positive and negative charges are oppositely arranged in a contact interface between the electrode and the electrolyte at an interval of a very short distance to form an electric double layer. Therefore, the electrolyte plays a role as an ion source for the formation of the electric double layer, so that it is an important substance dominating the basic characteristics of the energy-storing device likewise the electrode. As the electrolyte, there have hitherto been known an aqueous electrolyte, a non-aqueous electrolyte, a solid electrolyte and the like. From a point of improving the energy density of the electric double layer capacitor, the non-aqueous electrolyte capable of setting a high operating voltage particularly comes under the spotlight and are putting into practical use. As the non-aqueous electrolyte is now practiced a mixed solution obtained by dissolving a solute (support salt) such as $(C_2H_5)_4P \cdot BF_4$, $(C_2H_5)_4N \cdot BF_4$ or the like in an aprotic organic solvent having a high dielectric constant such as a carbonate (ethylene carbonate, propylene carbonate, etc), γ-butyrolactone or the like.

However, since the aprotic organic solvent is low in the flash point, there is a high risk of firing, for example, when the electric double layer capacitor ignites due to heat generation or the like. Moreover, there is a high risk that the aprotic organic solvent is vaporized and decomposed to generate a gas as the electric double layer capacitor generates heat, or the generated gas and heat cause explosion and ignition of the electric double layer capacitor.

DISCLOSURE OF THE INVENTION

It is, therefore, an object of the invention to provide an additive for a non-aqueous electrolyte of an electric double layer capacitor containing a combustion inhibiting substance releasing compound capable of releasing a combustion inhibiting substance having particularly excellent combustion inhibiting effect during combustion. Also, it is another object of the invention to provide a non-aqueous electrolyte for an electric double layer capacitor containing such an additive for a non-aqueous electrolyte and having an excellent safety, and a non-aqueous electrolyte electric double layer capacitor comprising such a non-aqueous electrolyte and having a high safety.

The inventor has made various studies in order to achieve the above objects and discovered that the combustion inhibiting substance having a specific structure has an excellent combustion inhibiting effect, and the safety in the non-aqueous electrolyte and the non-aqueous electrolyte electric double layer capacitor comprising such a non-aqueous electrolyte can be highly improved by adding a combustion inhibiting substance releasing compound capable of releasing such a combustion inhibiting substance to the non-aqueous electrolyte, and as a result the invention has been accomplished.

That is, the additive for the non-aqueous electrolyte of the electric double layer capacitor according to the invention comprises a combustion inhibiting substance releasing compound which releases a combustion inhibiting substance during combustion, and is characterized in that the combustion inhibiting substance is a phosphine oxide compound having P—F bond and/or P—NH$_2$ bond in its molecule.

In a preferable embodiment of the additive for the non-aqueous electrolyte of the electric double layer capacitor according to the invention, the combustion inhibiting substance is at least one of a self-extinguishing substance, a flame-retardant substance and a non-combustible substance.

In another preferable embodiment of the additive for the non-aqueous electrolyte of the electric double layer capacitor according to the invention, the phosphine oxide compound is represented by the following formula (I):

$$O = PR^1{}_3 \qquad (I)$$

(wherein $R^1$s are independently a monovalent substituent or a halogen element, provided that at least one of $R^1$s is fluorine or amino group). More preferably, $R^1$s in the formula (I) are independently selected from the group consisting of fluorine, amino group, an alkyl group and an alkoxy group, and at least one of $R^1$s is fluorine or amino group. Moreover, a phosphine oxide compound of the formula (I) wherein at least one of $R^1$s is fluorine and at least one of $R^1$s is amino group as well as a phosphine oxide compound of the formula (I) wherein at least two of $R^1$s are fluorine or amino group are particularly preferable.

In the other preferable embodiment of the additive for the non-aqueous electrolyte of the electric double layer capacitor according to the invention, the combustion inhibiting substance releasing compound contains phosphorus as well as fluorine and/or nitrogen in its molecule. More preferably, the combustion inhibiting substance releasing compound has phosphorus-nitrogen bond in its molecule. Also preferably, the combustion inhibiting substance releasing compound has phosphorus-fluorine bond in its molecule. As the combustion inhibiting substance releasing compound is preferably mentioned a phosphorane compound.

Further, the non-aqueous electrolyte for the electric double layer capacitor according to the invention is characterized by comprising the above-described additive for the non-aqueous electrolyte of the electric double layer capacitor and a support salt.

Preferably, the non-aqueous electrolyte for the electric double layer capacitor according to the invention further contains an aprotic organic solvent. As the aprotic organic solvent are preferable a nitrile compound, cyclic and chain ester compounds and a chain ether compound.

The non-aqueous electrolyte for the electric double layer capacitor according to the invention is preferable to be capable of releasing the combustion inhibiting substance at an amount of not less than 0.03 mol per 1 L of the non-aqueous electrolyte for the electric double layer capacitor during combustion.

The non-aqueous electrolyte for the electric double layer capacitor according to the invention is preferable to contain the combustion inhibiting substance releasing compound of not less than 3% by volume, more preferably not less than 5% by volume.

Furthermore, the non-aqueous electrolyte electric double layer capacitor according to the invention is characterized by comprising the above-described non-aqueous electrolyte for the electric double layer capacitor, a positive electrode and a negative electrode.

According to the invention, there can be provided the additive for the non-aqueous electrolyte of the electric double layer capacitor comprising the combustion inhibiting substance releasing compound which releases the phosphine oxide compound having P—F bond and/or P—$NH_2$ bond in its molecule as the combustion inhibiting substance during combustion and capable of lowering the combustion property of the non-aqueous electrolyte significantly. Also, there can be provided the non-aqueous electrolyte for the electric double layer capacitor containing such an additive, in which the risk of igniting-firing is highly reduced. Moreover, there can be provided the non-aqueous electrolyte electric double layer capacitor comprising the non-aqueous electrolyte, in which the safety is significantly improved.

BEST MODE FOR CARRYING OUT THE INVENTION

Additive for Non-Aqueous Electrolyte of Electric Double Layer Capacitor

The additive for the non-aqueous electrolyte of the electric double layer capacitor of the invention will be described in detail below. The additive for the non-aqueous electrolyte of the electric double layer capacitor according to the invention comprises a combustion inhibiting substance releasing compound which releases a combustion inhibiting substance during combustion, and is characterized in that the combustion inhibiting substance is a phosphine oxide compound having P—F bond and/or P—$NH_2$ bond in its molecule, and may further contain other components, if necessary. The phosphine oxide compound having P—F bond and/or P—$NH_2$ bond in its molecule has an action of significantly suppressing combustion property of an aprotic organic solvent usually included in the electrolyte. Therefore, the combustion property of the non-aqueous electrolyte can be highly suppressed by adding the combustion inhibiting substance releasing compound which releases the phosphine oxide compound having P—F bond and/or P—$NH_2$ bond in its molecule as the combustion inhibiting substance during combustion to the non-aqueous electrolyte.

The combustion inhibiting substance is not particularly limited as far as it can inhibit a combustion of a flame ignited on the non-aqueous electrolyte during combustion, but it is preferable to be one capable of rendering the non-aqueous electrolyte to be self-extinguishing, flame-retardant or non-combustible, that is, it is preferable to be a self-extinguishing substance, a flame-retardant substance or a non-combustible substance. The self-extinguishing property, flame retardance and non-combustibility used herein are defined by UL94HB method of UL (Underwriting Laboratory) standard. Concretely, when a test piece of 127 mm×12.7 mm is prepared by penetrating 1.0 mL of the electrolyte into a non-combustible quartz fiber and then the test piece is ignited under an atmospheric environment, "self-extinguishing property" means a case that the ignited flame extinguishes at a line of 25-100 mm and the ignition is not observed in a falling object form a net, "flame retardance" means a case that the ignited flame does not arrive at a line of 25 mm and the ignition is not observed in the falling object from the net, and "non-combustibility" means a case that the ignition is not caused (combustion length: 0 mm).

The combustion inhibiting substance is not particularly limited as far as it is the phosphine oxide compound having P—F bond and/or P—$NH_2$ bond in its molecule. Among such phosphine oxide compounds, the phosphine oxide compound represented by the formula (I) is preferable. In the formula (I), $R^1$s are independently a monovalent substituent or a halogen element, and at least one of $R^1$s is fluorine or amino group. As the halogen element are preferably mentioned fluorine, chlorine, bromine and the like. Among them, fluorine is particularly preferable. On the other hand, as the monovalent substituent are mentioned an amino group, an alkoxy group, an alkyl group, a carboxyl group, an acyl group, an aryl group and the like. Among them, the amino group is preferable in a point that the effect on decreasing the risk of igniting-firing the electrolyte is excellent. As the alkoxy group are mentioned methoxy group, ethoxy group, methoxy ethoxy group, propoxy group, phenoxy group and the like. As the alkyl group are mentioned methyl group, ethyl group, propyl group, butyl group, pentyl group and the like. As the acyl group are mentioned formyl group, acetyl group, propionyl group, butylyl group, isobutylyl group, valeryl group and the like. As the aryl group are mentioned phenyl group, tolyl group, naphthyl group and the like. In these monovalent substituents, a hydrogen element is preferable to be substituted with a halogen element. As the halogen element are preferably mentioned fluorine, chlorine, bromine and the like, and fluorine is most preferable and chlorine is second most preferable.

The phosphine oxide compound preferably has a halogen element content of not less than 10% by mass in the molecule, and more preferably has a halogen element content of not less than 15% by mass in the molecule. Moreover, the phosphine oxide compound preferably has a fluorine content of not less than 7% by mass in the molecule, and more preferably has a fluorine content of not less than 10% by mass in the molecule. The phosphine oxide compound having the halogen element content of not less than 10% by mass in the molecule is excellent in the effect of suppressing combustion of the non-aqueous electrolyte, and the phosphine oxide compound having the fluorine content of not less than 7% by mass in the molecule is particularly excellent in the effect of suppressing combustion of the non-aqueous electrolyte.

As the phosphine oxide compound are particularly preferable a phosphine oxide compound of the formula (I) wherein at least one of $R^1$s is fluorine and at least one of $R^1$s is amino group, and a phosphine oxide compound of the formula (I) wherein at least two of $R^1$s are fluorine or amino group. These phosphine oxide compounds have an excellent combustion inhibiting effect because a ratio of fluorine and amino group occupied in the molecule contributing to inhibit the combustion of the electrolyte is high.

As the phosphine oxide compound of the formula (I) are concretely mentioned trifluorophosphine oxide [O=PF$_3$], triaminophosphine oxide [O=P(NH$_2$)$_3$], aminodifluorophosphine oxide [O=PF$_2$NH$_2$], diaminofluorophosphine oxide [O=PF(NH$_2$)$_2$], methyl diaminophosphine oxide [O=P(NH$_2$)$_2$CH$_3$], methyl aminofluorophosphine oxide [O=PF(NH$_2$)CH$_3$], dimethoxy fluorophosphine oxide [O=PF(OCH$_3$)$_2$], ethoxy difluorophosphine oxide [O=PF$_2$(OC$_2$H$_5$)], methoxy difluorophosphine oxide [O=PF$_2$(OCH$_3$)], dimethyl fluorophosphine oxide [O=PF(CH$_3$)$_2$], diethoxy fluorophosphine oxide [O=PF(OC$_2$H$_5$)$_2$], methyl difluorophosphine oxide [O=PF$_2$(CH$_3$)] and the like.

The combustion inhibiting substance releasing compound used in the additive for the non-aqueous electrolyte of the electric double layer capacitor of the invention is not particularly limited as far as it can release the combustion inhibiting substance during combustion, and may release other combustion inhibiting substances such as $CO_2$, phosphate esters and so on. Moreover, the term "during the combustion" means a time that the non-aqueous electrolyte is ignited with a flame. As the combustion inhibiting substance releasing compound is preferable a compound containing phosphorus as well as fluorine and/or nitrogen in its molecule in a point that it can preferably release the combustion inhibiting substance.

Moreover, when the combustion inhibiting substance releasing compound contains phosphorus and fluorine in its molecule, it is considered that the combustion property of the electrolyte can be suppressed more effectively by an action of a fluorine radical generated during the combustion in addition to the combustion inhibiting substance. The content of fluorine in the combustion inhibiting substance releasing compound is preferably a range of 2-80% by mass, further preferably a range of 2-60% by mass, and more preferably a range of 2-50% by mass. When the content of fluorine in the combustion inhibiting substance releasing compound is less than 2% by mass, the effect of suppressing the combustion property of the electrolyte is small, while when it exceeds 80% by mass, the viscosity becomes high and the electric conductivity of the electrolyte may lower.

As the combustion inhibiting substance releasing compound is preferable a compound having phosphorus-nitrogen bond in its molecule in a point that it can preferably release the phosphine oxide compound having P—NH$_2$ bond in its molecule as the combustion inhibiting substance. As the compound having phosphorus-nitrogen bond in its molecule may be mentioned a phosphorane compound in which amino group is directly bonded to phosphorus in its molecule.

Furthermore, as the combustion inhibiting substance releasing compound is preferable a compound having phosphorus-fluorine bond in its molecule in a point that it can preferably release the phosphine oxide compound having P—F bond in its molecule as the combustion inhibiting substance. As the compound having P—F bond in its molecule can be used a phosphorus-containing compound such as a phosphine compound, a cyclophosphine compound, a phosphine oxide compound, a cyclophosphine oxide compound, a phosphine borane compound, a silaphosphane compound, a phosphoarsenic cyclosilazane compound, a phosphoxide borane compound, a phosphorane compound and the like, i.e. a compound in which fluorine is directly bonded to phosphorus in its molecule. Among them, the phosphorane compound in which fluorine is directly bonded to phosphorus in its molecule is preferable.

The phosphorane compound in which amino group or fluorine is directly bonded to phosphorus in its molecule is represented by the following formula (II):

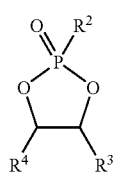

(wherein $R^2$ is amino group or fluorine, provided that a hydrogen element in the amino group may be substituted with fluorine, and $R^3$ and $R^4$ are a monovalent substituent, a halogen element or hydrogen).

As the halogen element in $R^3$ and $R^4$ of the formula (II) are preferably mentioned fluorine, chlorine, bromine and the like. Among them, fluorine is particularly preferable. On the other hand, as the monovalent substituent in $R^3$ and $R^4$ are mentioned an amino group, an alkoxy group, an alkyl group, a carboxyl group, an acyl group, an aryl group and the like. Among them, amino group is preferable in a point that the effect of decreasing the risk of igniting-firing the electrolyte is excellent. As the alkoxy group are mentioned methoxy group, ethoxy group, methoxy ethoxy group, propoxy group, phenoxy group and the like. As the alkyl group are mentioned methyl group, ethyl group, propyl group, butyl group, pentyl group and the like. As the acyl group are mentioned formyl group, acetyl group, propionyl group, butylyl group, isobutylyl group, valeryl group and the like. As the aryl group are mentioned phenyl group, tolyl group, naphthyl group and the like. In these monovalent substituents, a hydrogen element is preferable to be substituted with a halogen element. As the halogen element are preferably mentioned fluorine, chlorine, bromine and the like, and fluorine is most preferable and chlorine is second most preferable.

The phosphorane compound wherein $R^2$ is fluorine has P—F bond in its molecule and can preferably release the phosphine oxide compound having P—F bond in its molecule as the combustion inhibiting substance during combustion. Also, the phosphorane compound wherein $R^2$ is amino group has P—NH$_2$ bond in its molecule and can preferably release the phosphine oxide compound having P—NH$_2$ bond in its molecule as the combustion inhibiting substance during combustion.

The additive for the non-aqueous electrolyte of the invention may contain optional additives in addition to the above-mentioned combustion inhibiting substance releasing compound, unless they do not inhibit the effect of suppressing the combustion property of the electrolyte. Moreover, the amount of the combustion inhibiting substance releasing compound in the non-aqueous electrolyte is properly selected in accordance with the amount of the combustion inhibiting substance releasing compound in the non-aqueous electrolyte mentioned later.

Non-Aqueous Electrolyte for Electric Double Layer Capacitor

Then, the non-aqueous electrolyte for the electric double layer capacitor of the invention will be described in detail. The non-aqueous electrolyte for the electric double layer capacitor according to the invention comprises the abovementioned additive for the non-aqueous electrolyte and a support salt, and may further contain an aprotic organic solvent and so on, if necessary.

The support salt used in the non-aqueous electrolyte for the electric double layer capacitor of the invention can be selected from the conventionally known ones, but a quaternary ammonium salt is preferable in a point that the electric conduction or the like in the electrolyte is good. The quaternary ammonium salt is a solute of the electrolyte playing a role as an ion source for forming the electric double layer. The quaternary ammonium salt capable of forming a polyvalent ion is preferable in a point that it is possible to effectively improve the electric characteristics of the electrolyte such as electric conduction and the like.

As the quaternary ammonium salt are preferably mentioned $(CH_3)_4N.BF_4$, $(CH_3)_3C_2H_5N.BF_4$, $(CH_3)_2(C_2H_5)_2N.BF_4$, $CH_3(C_2H_5)_3N.BF_4$, $(C_2H_5)_4N.BF_4$, $(C_3H_7)_4N.BF_4$, $CH_3(C_4H_9)_3N.BF_4$, $(C_4H_9)_4N.BF_4$, $(C_6H_{13})_4N.BF_4$, $(C_2H_5)_4 N.ClO_4$, $(C_2H_5)_4N.AsF_6$, $(C_2H_5)_4N.SbF_6$, $(C_2H_5)_4N.CF_3SO_3$, $(C_2H_5)_4N.C_4F_9SO_3$, $(C_2H_5)_4N.(CF_3SO_2)_2N$, $(C_2H_5)_4N.BCH_3(C_2H_5)_3$, $(C_2H_5)_4N.B(C_2H_5)_4$, $(C_2H_5)_4N.B(C_4H_9)_4$, $(C_2H_5)_4N.B(C_6H_5)_4$ and the like. Also, hexafluorophosphates in which anion parts of these quaternary ammonium salts (e.g. $.BF_4$, $.ClO_4$, $.AsF_6$ and the like) are replaced with $.PF_6$ are preferable. Among them, a quaternary ammonium salt in which different alkyl groups are bonded to N atom is preferable in a point that the solubility can be improved by making a polarity large. Furthermore, as the quaternary ammonium salt are preferably mentioned, for example, compounds represented by the following formulae (a)-(j). In the formulae (a)-(j), Me is methyl group and Et is ethyl group.

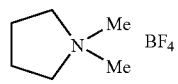

(a)

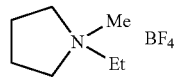

(b)

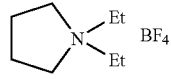

(c)

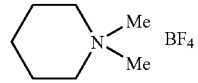

(d)

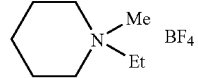

(e)

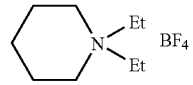

(f)

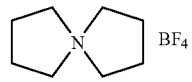

(g)

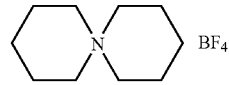

(h)

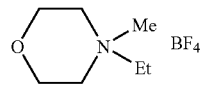

(i)

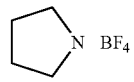

(j)

Among these quaternary ammonium salts, the salt capable of generating $(CH_3)_4N^+$, $(C_2H_5)_4N^+$ or the like as a cation is particularly preferable from a viewpoint of ensuring a high electric conduction. Also, the salt capable of producing an anion with a small formula weight is preferable. These quaternary ammonium salts may be used alone or in a combination of two or more.

The concentration of the support salt in the non-aqueous electrolyte for the electric double layer capacitor according to the invention is preferably 0.2-2.5 mol/L (M), more preferably 0.8-1.5 mol/L (M). When the concentration of the support salt is less than 0.2 mol/L, the electric characteristics of the electrolyte such as electric conduction and the like cannot be sufficiently ensured, while when it exceeds 2.5 mol/L, the viscosity of the electrolyte rises and the electric characteristics of the electrolyte such as electric conduction and the like may lower.

The aprotic organic solvent which may be used in the non-aqueous electrolyte of the invention can decrease the viscosity of the electrolyte and easily attain an optimum ion conductivity for the electric double layer capacitor. As the aprotic organic solvent are concretely and preferably mentioned nitrites such as acetonitrile (AN), propiononitrile, butyronitrile, isobutyronitrile, benzonitrile, and so on; ethers such as 1,2-dimethoxy ethane (DME), tetrahydrofuran (THF) and so on; and esters such as dimethyl carbonate (DMC), diethyl carbonate (DEC), ethyl methyl carbonate (EMC), ethylene carbonate (EC), propylene carbonate (PC), diphenyl carbonate, γ-butyrolactone (GBL), γ-valerolactone and so on. Among them, propylene carbonate, γ-butyrolactone and acetonitrile are preferable. Moreover, cyclic esters are preferable in a point that the dielectric constant is high and the solubility of the support salt is excellent, while chain esters and chain ethers are preferable in a point that they has a low viscosity and the viscosity of the electrolyte is made low. These aprotic organic solvents may be used alone or in a combination of two or more.

The non-aqueous electrolyte for the electric double layer capacitor of the invention preferably releases the combustion inhibiting substance of not less than 0.03 mol, more preferably 0.05-0.5 mol per 1 L of the non-aqueous electrolyte during combustion. When the amount of the combustion inhibiting substance released during combustion is less than 0.03 mol per 1 L of the non-aqueous electrolyte, the combustion property of the non-aqueous electrolyte may not be suppressed sufficiently.

The content of the combustion inhibiting substance releasing compound in the non-aqueous electrolyte for the electric double layer capacitor of the invention is preferably not less than 3% by volume, more preferably not less than 5% by volume. When the content of the combustion inhibiting substance releasing compound in the non-aqueous electrolyte is not less than 3% by volume, the risk of igniting-firing the non-aqueous electrolyte can be sufficiently suppressed. Moreover, the non-aqueous electrolyte for the electric double layer capacitor of the invention may contain only one kind of the combustion inhibiting substance releasing compound or two or more kinds thereof.

Non-Aqueous Electrolyte Electric Double Layer Capacitor

Then, the non-aqueous electrolyte electric double layer capacitor of the invention will be described in detail. The non-aqueous electrolyte electric double layer capacitor according to the invention comprises the above-mentioned non-aqueous electrolyte for the electric double layer capacitor, a positive electrode and a negative electrode, and may be provided with other members usually used in the technical field of the electric double layer capacitor such as a separator and the like, if necessary.

The positive and negative electrodes of the non-aqueous electrolyte electric double layer capacitor according to the invention are not particularly limited, but are preferable to be usually a porous carbon-based polarizable electrode. The electrode is usually preferable to have such properties that the specific surface area and bulk gravity are high and it is electrochemically inactive and the resistivity is low, and the like. As the porous carbon are mentioned an active carbon and the like.

The electrode generally contains the porous carbon such as the active carbon or the like, and may contain other components such as an electrically conducting agent, a binding agent and the like, if necessary. The raw material of the active carbon preferably used as the electrode is not particularly limited, but preferably includes phenolic resin, various heat-resistant resins, pitch and the like. As the heat-resistant resin are preferably mentioned resins such as polyimide, polyamide, polyamideimide, polyether imide, polyether sulfone, polyether ketone, bismaleimide triazine, aramide, fluorine resin, polyphenylene, polyphenylene sulfide and the like. They may be used alone or in a combination of two or more. As the shape of the active carbon are preferable powder, fibrous cloth and the like from a point that the specific surface area is made higher to increase the charge capacity of the non-aqueous electrolyte electric double layer capacitor. Also, the active carbon may be subjected to a treatment such as heat treatment, drawing, high-temperature treatment under vacuum, rolling or the like for the purpose of increasing the charge capacity of the electric double layer capacitor.

The electrically conducting agent used in the electrode is not particularly limited, but includes graphite, acetylene black and the like. Also, the binding agent used in the electrode is not particularly limited, but includes polyvinylidene fluoride (PVDF), polytetrafluoroethylene (PTFE), styrene-butadiene rubber (SBR), carboxymethyl cellulose (CMC) and the like. These additives may be compounded in the same compounding ratio as in the conventional case.

The non-aqueous electrolyte electric double layer capacitor according to the invention is preferable to comprise a separator, a collector, a container and the like in addition to the above-mentioned electrodes (the positive and negative electrodes) and the non-aqueous electrolyte, and may be further provided with various known members usually used in the electric double layer capacitor. At this moment, the separator is interposed between the positive and negative electrodes for the purpose of preventing the short-circuiting of the non-aqueous electrolyte electric double layer capacitor or the like. The separator is not particularly limited, but there are preferably used known separators usually used as a separator for the non-aqueous electrolyte electric double layer capacitor. As the material of the separator are preferably mentioned microporous films, non-woven fabrics, papers and the like. Concretely, there are preferably mentioned non-woven fabrics, thin-layer films and the like made of synthetic resin such as polytetrafluoroethylene, polypropylene, polyethylene or the like. Among them, a microporous film of polypropylene or polyethylene having a thickness of about 20-50 μm is particularly preferable.

The collector is not particularly limited, but there are preferably used known ones usually used as a collector for the non-aqueous electrolyte electric double layer capacitor. As the collector, it is preferable to be excellent in the electrochemically corrosion resistance, chemically corrosion resistance, workability, and mechanical strengths and low in the cost, and a collector layer made of aluminum, stainless steel, electrically conductive resin or the like is preferable. Moreover, the container is not particularly limited, but there are preferably mentioned known ones usually used as a container for the non-aqueous electrolyte electric double layer capacitor. As the material of the container are preferable aluminum, stainless steel, electrically conductive resins and the like.

The shape of the non-aqueous electrolyte electric double layer capacitor according to the invention is not particularly limited, but there are preferably mentioned various known shapes such as cylinder type (cylindrical shape, square shape), flat type (coin type) and the like. The non-aqueous electrolyte electric double layer capacitor is preferably used as a main power source or an auxiliary power source for an electric automobile and a fuel cell vehicle, and as power sources for memory backup of various electronics, industrial instruments and airplane instruments and the like, for electromagnetic holding of toys, cordless equipments, gas equipments, flash water heaters and the like and for watches such as wrist watch, wall clock, solar watch, AGS wrist watch and the like.

EXAMPLES

The following examples are given in illustration of the invention and are not intended as limitations thereof.

Example 1

Tetraethyl ammonium tetrafluoroborate [$Et_4N.BF_4$] (support salt) is dissolved in a mixed solution consisting of 90% by volume of propylene carbonate (PC) and 10% by volume of a phosphorane compound A represented by the following formula (III):

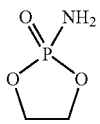

(III)

at a concentration of 1 mol/L (M) to prepare a non-aqueous electrolyte. The safety of the non-aqueous electrolyte thus obtained is evaluated by the above-mentioned method according to UL94HB method of UL (Underwriting Laboratory) standard. Moreover, "combustion property" in this test means a case that the ignited flame exceeds a line of 100 mm. Furthermore, the limit oxygen index and the amount of the phosphine oxide compound generated during combustion in the non-aqueous electrolyte are measured by the following methods. The results are shown in Table 1.

(1) Limit Oxygen Index of the Electrolyte

The limit oxygen index of the electrolyte is measured according to JIS K 7201. The larger the limit oxygen index, the more difficult the combustion of the electrolyte. Concretely, a test piece is prepared by reinforcing a $SiO_2$ sheet (quartz filter paper, incombustible) of 127 mm×12.7 mm with U-shaped aluminum foil into a self-supported state and impregnating such a $SiO_2$ sheet with 1.0 mL of the electrolyte. The test piece is vertically attached to a test piece supporting member so as to position at a distance separated from an upper end portion of a combustion cylinder (inner diameter: 75 mm, height: 450 mm, equally filled with glass particles of 4 mm in diameter from a bottom to a thickness of 100±5 mm, and placed a metal net thereon) to not less than 100 mm. Then, oxygen (equal to or more than JIS K 1101) and nitrogen (equal to or more than grade 2 of JIS K 1107) are flown through the combustion cylinder and the test piece is ignited under a predetermined condition (heat source is Type 1, No. 1 of JIS K 2240) to examine combustion state. In this case, a total flow amount in the combustion cylinder is 11.4 L/min. This test is repeated three times, and an average value thereof is shown in Table 2. The oxygen index means a value of a minimum oxygen concentration required for maintaining combustion of a material and represented by a volume percentage. The limit oxygen index in the invention is calculated from minimum oxygen flow amount required for continuing the combustion of the test piece over 3 minutes or more or continuing the combustion after the firing so as to maintain the combustion length of not less than 50 mm and minimum nitrogen flow amount at this time according to the following equation:

Limit oxygen index=(Oxygen flow amount)/[(Oxygen flow amount)+(Nitrogen flow amount)]×100

(2) Amount of the Phosphine Oxide Compound Generated During Combustion

An electrolyte impregnated into an incombustible quartz sheet is ignited at a flame temperature of 800° C. in a combustion chamber (30×30×30 cm), and a gas generated is adsorbed in a gas collecting tube (filled with a Tenax TA) and analyzed by a TDS-GC-MS. Moreover, a DB-5 column (column length: 30 m, inner diameter: 0.25 mm, film thickness: 0.25 μm) is used in GC, and the temperature of the column is 40-300° C. (heating rate: 25° C./min) and the measured mass range of the MS is 5-500.

Preparation of Non-Aqueous Electrolyte Electric Double Layer Capacitor

Then, an active carbon [AC, trade name: Kuractive-1500, made by Kurare Chemical Co., Ltd.], acetylene black (electrically conducting agent) and polyvinylidene fluoride (PVDF) (binding agent) are mixed at a mass ratio (active carbon:acetylene black:PVDF) of 8:1:1 to obtain a mixture. 100 g of the resulting mixture is weighed and placed in a carbon pressure vessel of 20 mmφ and green-compacted at room temperature under a pressure of 150 kgf/cm² to prepare a positive electrode and a negative electrode (electrodes). A cell is assembled by using the resulting electrodes (positive and negative electrodes), an aluminum metal plate (collector) (thickness: 0.5 mm) and a polypropylene/polyethylene plate (separator) (thickness: 25 μm) and sufficiently dried through vacuum drying. This cell is impregnated with the non-aqueous electrolyte to prepare a non-aqueous electrolyte electric double layer capacitor. The electric conductivity, cycle performance and low-temperature characteristics of the electric double layer capacitor thus obtained are tested by the following methods. The results are shown in Table 1.

(3) Electric Conductivity

The electric conductivity is measured by using an electric conductivity meter [trade name: CDM210, made by Radiometer Trading Co., Ltd.] with applying a constant current of 5 mA to the resulting electric double layer capacitor.

(4) Cycle Performance of Electric Double Layer Capacitor

The initial electrostatic capacity and the electrostatic capacity after 1000 cycles of charge-discharges are measured to calculate the capacity maintenance ratio after 1000 cycles as an evaluation of the cycle performance.

(5) Low-Temperature Characteristics of Electric Double Layer Capacitor

The internal resistance of the resulting non-aqueous electrolyte electric double layer capacitor is measured in an atmosphere of 20° C. or −10° C., respectively, to evaluate the low-temperature characteristics of the capacitor. At this moment, the internal resistances (Ω) can be obtained by a well-known method of measuring the internal resistance, for example, a method in which a charge-discharge curve is determined to measure a deviation width of a potential accompanied with the stop of charge (charge rest) or the stop of discharge (discharge rest).

Example 2

A non-aqueous electrolyte is prepared in the same manner as in Example 1 except that a phosphorane compound B represented by the following formula (IV):

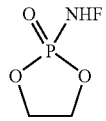

(IV)

is used instead of the phosphorane compound A represented by the formula (III), and then the safety in the non-aqueous electrolyte and the amount of the phosphine oxide compound generated therein are evaluated and measured. Furthermore, an electric double layer capacitor is made by using the non-aqueous electrolyte and the same manner as in Example 1 and the performances of the capacitor are evaluated. The results are shown in Table 1.

Example 3

A non-aqueous electrolyte and an electric double layer capacitor are made in the same manner as in Example 1 except that a phosphorane compound C represented by the following formula (V):

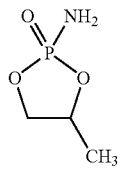

(V)

is used instead of the phosphorane compound A represented by the formula (III) and the evaluation thereof is conducted. The results are shown in Table 1.

Comparative Example 1

A non-aqueous electrolyte is prepared by dissolving tetraethyl ammonium tetrafluoroborate [$Et_4N.BF_4$] (support salt) in 100% by volume of propylene carbonate (PC) at a concentration of 1 mol/L (M) and evaluated in the same manner as in Example 1. Also, an electric double layer capacitor is made by using the non-aqueous electrolyte and the same manner as in Example 1 and evaluated. The results are shown in Table 1.

compound having P—F bond and/or P—$NH_2$ bond in its molecule and the combustion inhibiting substance releasing compound is a phosphorane compound represented by the following formula (II):

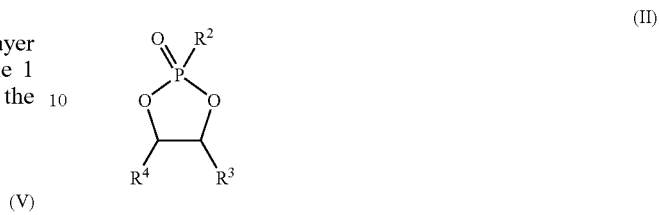

wherein $R^2$ is amino group or fluorine, provided that a hydrogen element in the amino group may be substituted with fluorine; and $R^3$ and $R^4$ are a monovalent substituent, a halogen element or hydrogen.

2. An additive for a non-aqueous electrolyte of an electric double layer capacitor according to claim 1, wherein the combustion inhibiting substance is at least one of a self-extinguishing substance, a flame-retardant substance and a non-combustible substance.

3. An additive for a non-aqueous electrolyte of an electric double layer capacitor according to claim 1, wherein the phosphine oxide compound is represented by the following formula (I):

$$O=PR^1_3 \quad (I)$$

(wherein $R^1$s are independently a monovalent substituent or a halogen element, provided that at least one of $R^1$s is fluorine or amino group).

4. An additive for a non-aqueous electrolyte of an electric double layer capacitor according to claim 3, wherein $R^1$s in

TABLE 1

|  |  |  | Comparative Example 1 | Example 1 | Example 2 | Example 3 |
|---|---|---|---|---|---|---|
| Safety of electrolyte |  |  | Combustion property | Non-combustibility | Non-combustibility | Non-combustibility |
| Limit oxygen index of electrolyte |  | vol % | 18.3 | 22.8 | 23.0 | 22.0 |
| Phosphine oxide generated | O=PF($OCH_3$)$_2$ | mol/L-electrolyte | 0.00 | 0.00 | 0.03 | 0.00 |
|  | O=$PF_2$($OCH_3$) |  | 0.000 | 0.000 | 0.026 | 0.000 |
|  | O=P($NH_2$)($OCH_3$)$_2$ |  | 0.000 | 0.060 | 0.032 | 0.053 |
|  | O=$PF_2NH_2$ |  | 0.00 | 0.00 | 0.03 | 0.00 |
| Initial characteristics | Electric conductivity | mS/cm | 10.3 | 9.85 | 9.95 | 9.75 |
| Cycle performance | Capacity maintenance ratio | % | 94 | 95 | 96 | 96 |
| Low-temperature characteristics | Internal resistance (20° C.) | Ω | 0.08 | 0.10 | 0.09 | 0.09 |
|  | Internal resistance (−10° C.) | Ω | 0.14 | 0.18 | 0.15 | 0.16 |

It can be seen that the phosphine oxide compound having P—F bond and/or P—$NH_2$ bond in its molecule is generated during combustion of the non-aqueous electrolyte and the combustion property of the non-aqueous electrolyte is suppressed in Examples 1-3. Also, the electric double layer capacitors of Examples 1-3 have sufficient characteristics as a capacitor.

The invention claimed is:

1. An additive for a non-aqueous electrolyte of an electric double layer capacitor comprising a combustion inhibiting substance releasing compound which releases a combustion inhibiting substance during combustion, characterized in that the combustion inhibiting substance is a phosphine oxide the formula (I) are independently selected from the group consisting of fluorine, an amino group, an alkyl group and an alkoxy group, and at least one of $R^1$s is fluorine or amino group.

5. An additive for a non-aqueous electrolyte of an electric double layer capacitor according to claim 4, wherein at least one of $R^1$s in the formula (I) is fluorine and at least one of $R^1$s in the formula (I) is amino group.

6. An additive for a non-aqueous electrolyte of an electric double layer capacitor according to claim 4, wherein $R^1$s in the formula (I) are independently fluorine or amino group.

7. An additive for a non-aqueous electrolyte of an electric double layer capacitor according to claim 1, wherein the combustion inhibiting substance releasing compound has phosphorus-nitrogen bond in its molecule.

8. An additive for a non-aqueous electrolyte of an electric double layer capacitor according to claim 1, wherein the combustion inhibiting substance releasing compound has phosphorus-fluorine bond in its molecule.

9. A non-aqueous electrolyte for an electric double layer capacitor comprising an additive for a non-aqueous electrolyte of an electric double layer capacitor as claimed in claim 1 and a support salt.

10. A non-aqueous electrolyte for an electric double layer capacitor according to claim 9, which further contains an aprotic organic solvent.

11. A non-aqueous electrolyte for an electric double layer capacitor according to claim 10, wherein the aprotic organic solvent comprises a nitrile compound, a cyclic or chain ester compound or a chain ether compound.

12. A non-aqueous electrolyte for an electric double layer capacitor according to claim 9, which releases the combustion inhibiting substance of not less than 0.03 mol per 1 L of the non-aqueous electrolyte for the electric double layer capacitor during combustion.

13. A non-aqueous electrolyte for an electric double layer capacitor according to claim 9, which contains the combustion inhibiting substance releasing compound of not less than 3% by volume.

14. A non-aqueous electrolyte for an electric double layer capacitor according to claim 13, which contains the combustion inhibiting substance releasing compound of not less than 5% by volume.

15. A non-aqueous electrolyte electric double layer capacitor comprising a non-aqueous electrolyte for an electric double layer capacitor as claimed in claim 9, a positive electrode and a negative electrode.

* * * * *